United States Patent
Glaser

(10) Patent No.: US 10,036,643 B2
(45) Date of Patent: Jul. 31, 2018

(54) AUGMENTED OPERATION OF NAVIGATION APPARATUS

(71) Applicant: International Business Machines Corporation, Armonk, NY (US)

(72) Inventor: Amir Glaser, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 8 days.

(21) Appl. No.: 15/267,693

(22) Filed: Sep. 16, 2016

(65) Prior Publication Data
US 2018/0080780 A1 Mar. 22, 2018

(51) Int. Cl.
*G01C 21/26* (2006.01)
*G01C 21/34* (2006.01)

(52) U.S. Cl.
CPC .............................. *G01C 21/3453* (2013.01)

(58) Field of Classification Search
CPC ..... G01C 21/3453; G01C 21/00; A63F 13/12; A63F 13/30; G06F 19/00; A63B 67/00; A63B 17/00; H04L 29/08; G06Q 30/02; G06Q 30/0282
USPC ........................................................ 701/465
See application file for complete search history.

(56) References Cited

U.S. PATENT DOCUMENTS

| | | | |
|---|---|---|---|
| 8,073,614 B2 | 12/2011 | Coughlin et al. | |
| 8,364,395 B2 * | 1/2013 | French | G01C 21/3453 701/410 |
| 8,706,399 B2 * | 4/2014 | Irish | A63F 13/12 273/461 |
| 8,719,209 B2 * | 5/2014 | Aben | G01C 21/26 706/50 |
| 9,037,405 B2 | 5/2015 | Gourlay et al. | |
| 9,207,084 B2 | 12/2015 | Stahl et al. | |
| 9,288,627 B2 * | 3/2016 | Irish | H04W 4/025 |
| 9,386,072 B2 * | 7/2016 | Irish | G06Q 30/02 |

OTHER PUBLICATIONS

Bhowmick et al., A temporal constraint based planning approach for city tour and travel plan generation, 2012, IEEE, p. 1-6 (Year: 2012).*
Schuchman et al., Applicability of an augmented GPS for navigation in the National Airspace System, 1989, IEEE, p. 1709-1727 (Year: 1989).*
Rehman et al., A constraint-aware optimized path recommender in a crowdsourced environment, 2015, IEEE, p. 1-8 (Year: 2015).*
Liu et al., Continual queries for Internet scale event-driven information delivery, 1999, IEEE, p. 610-628.*

* cited by examiner

*Primary Examiner* — McDieunel Marc
(74) *Attorney, Agent, or Firm* — Scully, Scott, Murphy & Presser, P.C.; Margaret McNamara, Esq.

(57) ABSTRACT

Augmented operation of navigation apparatus, including determining that a timer condition is met by a temporal proximity timer of a predefined temporal proximity action plan, wherein the temporal proximity timer is updated by navigation apparatus based on an estimated time of arrival at a destination of a moving entity tracked by the navigation apparatus, and performing, responsive to determining that the timer condition is met, a predefined temporal proximity action associated with the predefined temporal proximity action plan.

15 Claims, 4 Drawing Sheets

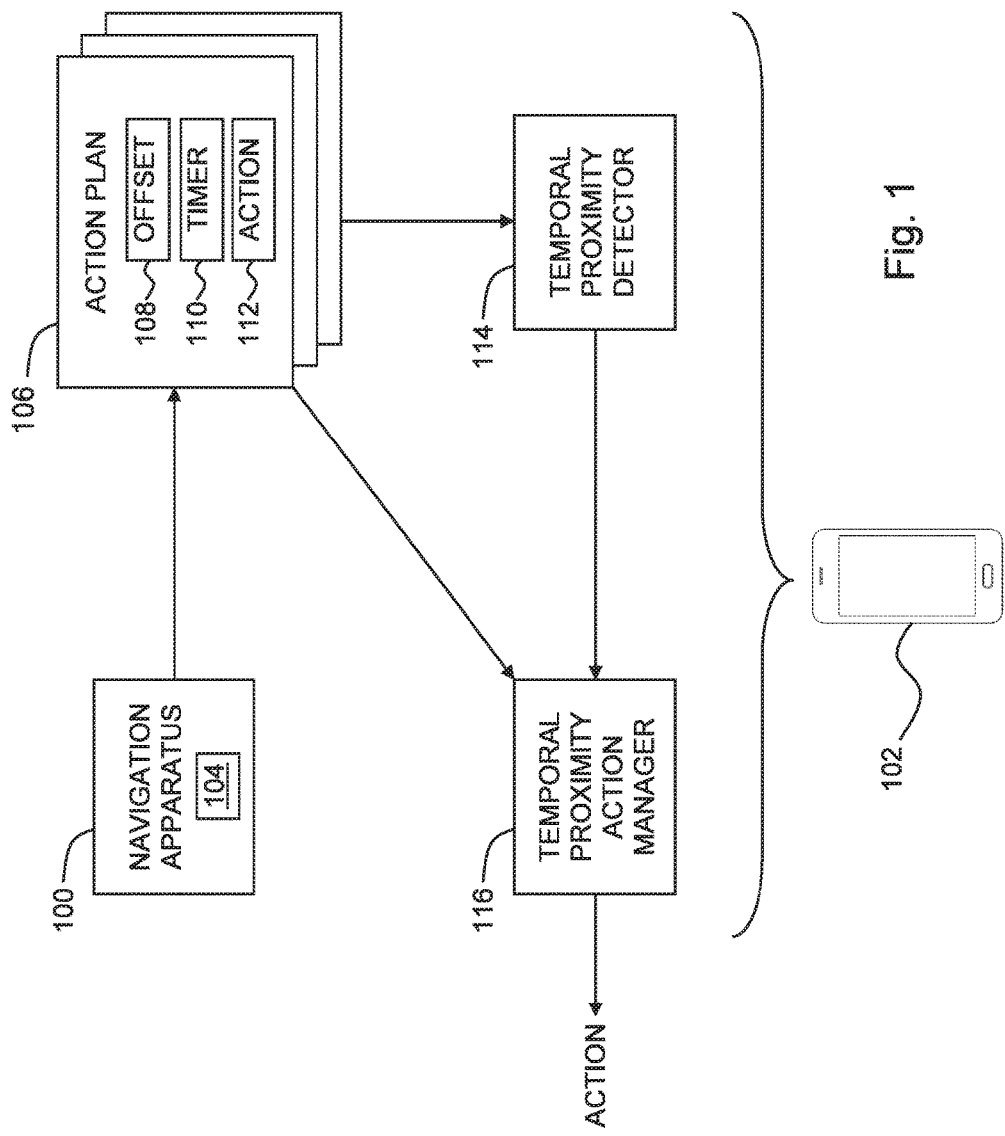

AUGMENTED OPERATION OF NAVIGATION APPARATUS

BACKGROUND

Software applications such as Apple Maps™, Google Maps™ and Google Waze™ provide navigation services on mobile devices. Such navigation applications typically maintain an estimated time of arrival (ETA) to a specified destination for information purposes only.

SUMMARY

In one aspect, this disclosure provides a method for augmented operation of navigation apparatus, the method including determining that a timer condition is met by a temporal proximity timer of a predefined temporal proximity action plan, wherein the temporal proximity timer is updated by navigation apparatus based on an estimated time of arrival at a destination of a moving entity tracked by the navigation apparatus, and performing, responsive to determining that the timer condition is met, a predefined temporal proximity action associated with the predefined temporal proximity action plan.

In other aspects of the disclosure, systems and computer program products embodying the methods are provided.

BRIEF DESCRIPTION OF THE DRAWINGS

Aspects of the present disclosure will be understood and appreciated more fully from the following detailed description taken in conjunction with the appended drawings in which:

FIG. 1 is a simplified conceptual illustration of a system for augmented operation of navigation apparatus, constructed and operative in accordance with an embodiment;

DETAILED DESCRIPTION

Figure 2A:
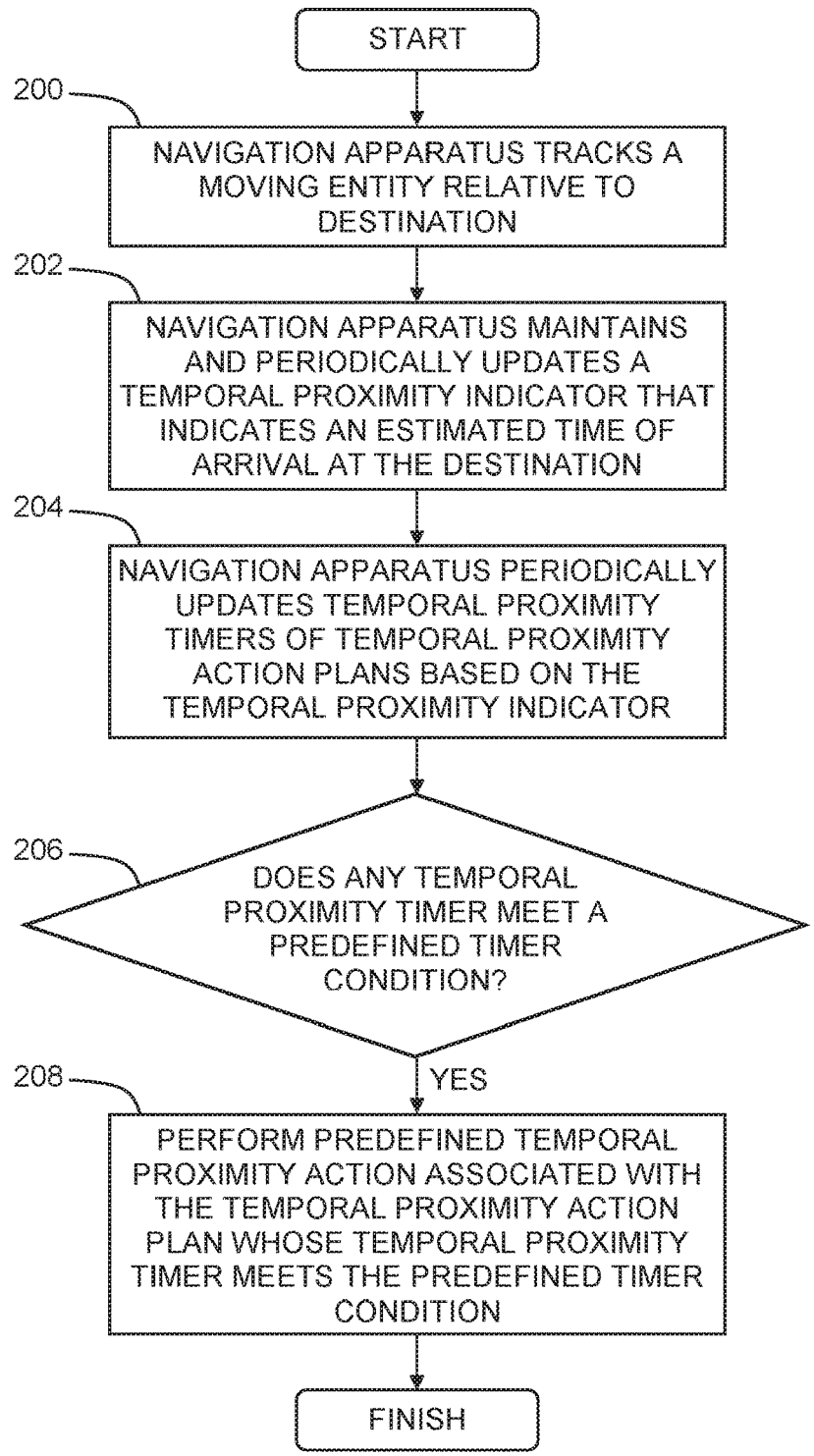
FIGS. 2A and 2B are simplified flowchart illustrations of exemplary methods of operation of the system of FIG. 1, operative in accordance with various embodiments.

Embodiments of the present disclosure may include a system, a method, and/or a computer program product. The computer program product may include a computer readable storage medium (or media) having computer readable program instructions thereon for causing a processor to carry out aspects of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the invention.

Aspects of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, which is a simplified conceptual illustration of a system for augmented operation of navigation apparatus, constructed and operative in accordance with an embodiment of the invention. In the system of FIG. 1, navigation apparatus 100 is shown, which is used for navigation of entities, such as vehicles, moving relative to specified destinations at geographical locations. Navigation apparatus 100 may, for example, be Waze™ or Google Maps™ navigation software executed by a computing device 102 such as a mobile telephone. Navigation apparatus 100 is configured in accordance with conventional techniques to maintain and periodically update a temporal proximity indicator 104, such as which indicates an estimated time of arrival (ETA), using any units of time, at a destination of a moving entity tracked by navigation apparatus 100.

One or more temporal proximity action plans 106 are created and maintained, such as by a user of computing device 102, in a manner that is separate from the operation of navigation apparatus 100, such as by any known text editor software or database management software, or by an intelligent personal assistant such as Siri™, commercially-available from Apple Computers, or Cortana™, commercially-available from Microsoft Corporation. Temporal proximity action plans 106 may be created and stored on computing device 102, or may be created and/or stored elsewhere provided that access to temporal proximity action plans 106 is provided to navigation apparatus 100 and other elements of FIG. 1 as described herein. Each temporal proximity action plan 106 preferably includes a temporal proximity offset 108, a temporal proximity timer 110, and a temporal proximity action 112, where values for temporal proximity offset 108 and temporal proximity action 112 are provided when their associated temporal proximity action plan 106 is created, and where a value for temporal proximity timer 110 is not provided when its associated temporal proximity action plan 106 is created. Thus, for example, if it is desired to receive an audible alert 5 minutes before arriving at a destination, a temporal proximity action plan 106 may be created with a temporal proximity offset 108 value of 5 minutes and a temporal proximity action 112 value indicating that an audible alert be issued.

Navigation apparatus 100 is configured to periodically update temporal proximity timers 110 of temporal proximity action plans 106 based on temporal proximity indicator 104. Thus, for example, when navigation apparatus 100 is navigating to a given destination, and temporal proximity indicator 104 indicates that the current ETA to the given destination is 8 minutes, or 12:08 pm, navigation apparatus 100 sets the value of temporal proximity timers 110 of temporal proximity action plans 106 to 8 minutes, or to the actual ETA time of 12:08 pm. Navigation apparatus 100 may, for example, be configured to periodically update temporal proximity timers 110 based on a predefined update frequency, such as once a minute, or whenever the ETA changes. Navigation apparatus 100 preferably updates temporal proximity timers 110 via a predefined application programming interface (API) provided for this purpose on computing device 102, such as by its operating system.

A temporal proximity detector 114 is preferably configured to operate separately from the operation of navigation apparatus 100, and is configured to determine whether the value of a temporal proximity timer 110 of any of temporal proximity action plans 106 meets a predefined timer condition, such as whether the value of temporal proximity timer 110 for any given temporal proximity action plan 106 indicates the current time, or, if the value of temporal proximity timer 110 indicates an ETA in units, such as a number of minutes, whether the value of temporal proximity timer 110 is less than or equal to the value of temporal proximity offset 108.

A temporal proximity action manager 116 is preferably configured to operate separately from the operation of navigation apparatus 100, and is configured to perform the predefined temporal proximity action 112, which may include one or more actions, that is associated with any given predefined temporal proximity action plan 106 in response to temporal proximity detector 114 determining that the value of the temporal proximity timer 110 of the given temporal proximity action plans 106 meets the predefined timer condition. In one embodiment, predefined temporal proximity action 112 indicates that a predefined alert notification is to be issued to a recipient 116, such as may be a human operator of the system of FIG. 1 or of a moving entity tracked by navigation apparatus 100. In another embodiment, predefined temporal proximity action 112 indicates that a communication be sent via a computer network to climate control apparatus at the destination instructing that air conditioning be activated.

Any of the elements shown in FIG. 1 are preferably implemented by one or more computers, such as by computing device 102, in computer hardware and/or in computer software embodied in a non-transitory, computer-readable medium in accordance with conventional techniques.

Reference is now made to FIG. 2A, which is a simplified flowchart illustration of an exemplary method of operation of the system of FIG. 1, operative in accordance with an embodiment of the invention. In the method of FIG. 2A, navigation apparatus tracks a moving entity relative to a destination (step 200) and maintains and periodically updates a temporal proximity indicator that indicates an estimated time of arrival at the destination (step 202). The navigation apparatus periodically updates temporal proximity timers of temporal proximity action plans based on the temporal proximity indicator (step 204). Separately from the operation of the navigation apparatus, it is determined whether the value of a temporal proximity timer of any temporal proximity action plan meets a predefined timer condition (step 206). If the timer condition is met, a predefined temporal proximity action, associated with the predefined temporal proximity action plan, is performed (step 208), such as by issuing a predefined alert notification to a recipient, such as may be a human operator of the system of FIG. 1 or of a moving entity tracked by the navigation apparatus.

Figure 2B:
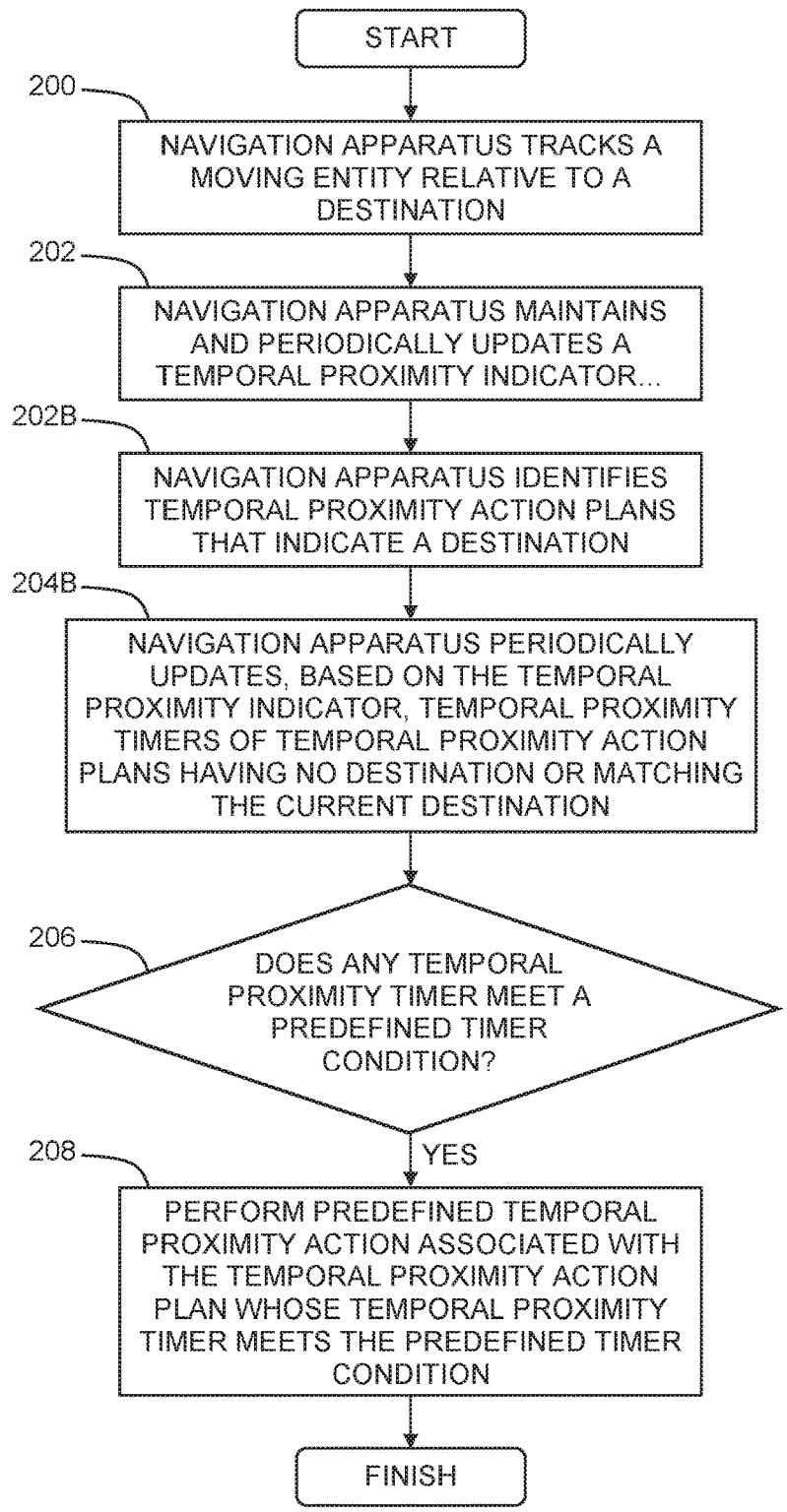

Reference is now made to FIG. 2B, which is a simplified flowchart illustration of an exemplary method of operation of the system of FIG. 1, operative in accordance with an alternative embodiment of the invention in which a temporal proximity action plan 106 (FIG. 1) includes a destination identifier which may optionally be used to indicate a specific destination, such as "home." The method of FIG. 2B is substantially similar to method of FIG. 2A, but with the notable exception that the navigation apparatus periodically accesses the temporal proximity action plans to identify any temporal proximity action plans that indicate a specific destination (step 202B) and updates, based on the temporal proximity indicator, temporal proximity timers of temporal proximity action plans that a) do not indicate a specific destination or b) indicate a destination that matches the navigational destination of the navigation apparatus (step 204B).

Figure 3:
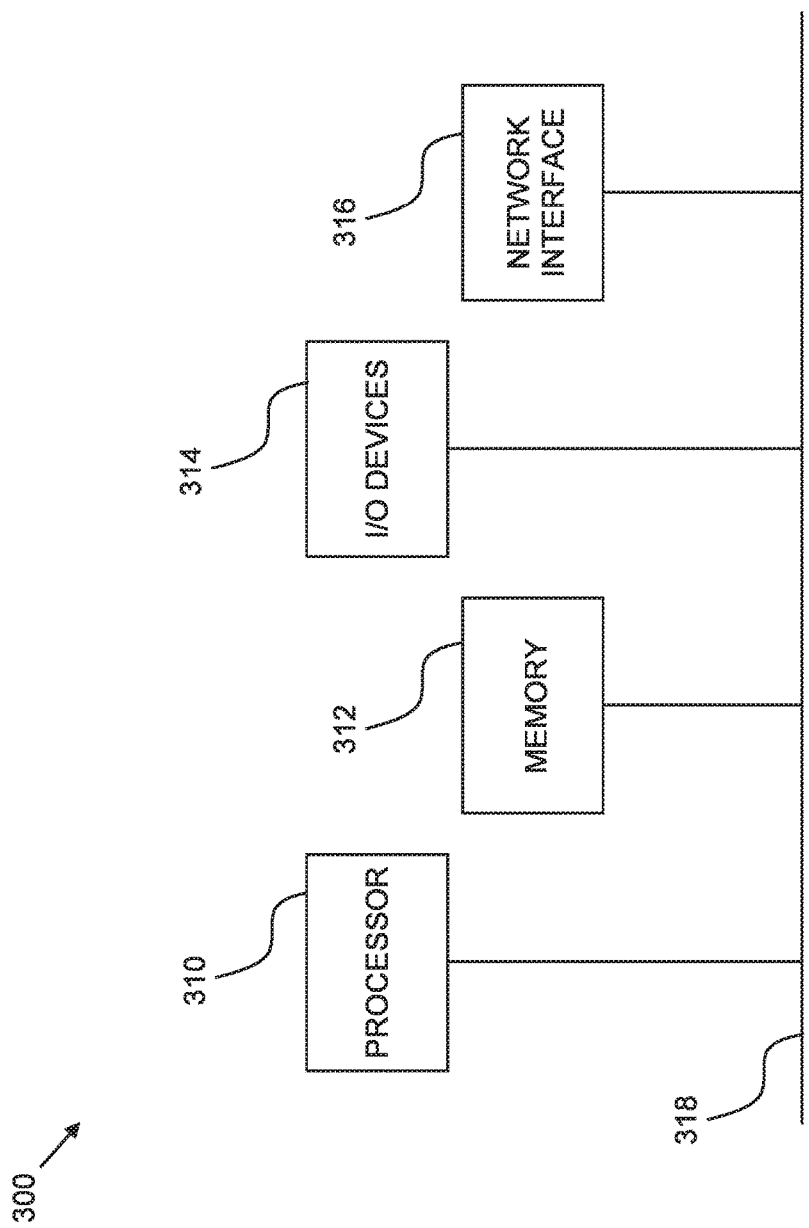
FIG. 3 is a simplified block diagram illustration of an exemplary hardware implementation of a computing system, constructed and operative in accordance with an embodiment.

Referring now to FIG. 3, block diagram 300 illustrates an exemplary hardware implementation of a computing system in accordance with which one or more components/methodologies of the present disclosure (e.g., components/methodologies described in the context of FIGS. 1-2B) may be implemented, according to an embodiment of the invention. As shown, the invention may be implemented in accordance with a processor 310, a memory 312, I/O devices 314, and a network interface 316, coupled via a computer bus 318 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for augmenting operation of a navigation apparatus associated with a moving entity, the method comprising:

storing, in a memory storage unit associated with a computing device, one or more temporal proximity action plans, each action plan having a temporal proximity timer specifying an estimated time value corresponding to an arrival time at a destination of the moving entity, specifying an associated temporal proximity action, and specifying a temporal proximity offset value;

determining, by a processor of said computing device, that the time value of the temporal proximity timer is less than or equal to the temporal proximity offset value of one of said predefined temporal proximity action plans, wherein the temporal proximity timer is updated by the navigation apparatus based on an estimated time of arrival at the destination of the moving entity tracked by the navigation apparatus; and responsive to determining that the value of the temporal proximity timer is less than or equal to the temporal proximity offset value, using said processor of said computing device to perform the predefined temporal proximity action associated with the predefined temporal proximity action plan; and said performed proximity action comprises communicating an alert notification to a recipient via an interface of said computing device.

2. The method according to claim 1 wherein the determining and performing are performed separately from operation of the navigation apparatus.

3. The method according to claim 1 further comprising: using said processor of said computer to perform the predefined temporal proximity action associated with the predefined temporal proximity action plan when a value of the temporal proximity timer indicates a current time.

4. The method according to claim 1 wherein said navigation apparatus updates said temporal proximity timer with an updated estimated time of arrival at a destination of the moving entity via a predefined application programming interface on said computing device.

5. The method according to claim 1, wherein said performed proximity action comprises communicating, via a network, an instruction to activate an appliance at the destination.

6. A system for augmenting operation of a navigation apparatus associated with a moving entity, the system comprising:

a memory storage unit storing program instructions;
a processor for running said stored program instructions to configure the processor to:
store in the memory storage unit, one or more temporal proximity action plans, each action plan having a temporal proximity timer specifying an estimated time value corresponding to an arrival time at a destination of the moving entity, specifying an associated temporal proximity action, and specifying a temporal proximity offset value;

determine that the time value of the temporal proximity timer is less than or equal to the temporal proximity offset value of one of said predefined temporal proximity action plans, wherein the temporal proximity timer is updated by the navigation apparatus based on an estimated time of arrival at the destination of the moving entity tracked by the navigation apparatus; and perform, responsive to determining that the value of the temporal proximity timer is less than or equal to the temporal proximity offset value, the predefined temporal proximity action associated with the predefined temporal proximity action plan; and said performed proximity action comprises communicating an alert notification to a recipient via an interface of said computing device.

7. The system according to claim 6 wherein the temporal proximity detector and the temporal proximity action manager operate separately from operation of the navigation apparatus.

8. The system according to claim 6 wherein said processor is further configured to perform the predefined temporal proximity action associated with the predefined temporal proximity action plan when a value of the temporal proximity timer indicates a current time.

9. The system according to claim 6 wherein said navigation apparatus updates said temporal proximity timer with an updated estimated time of arrival at a destination of the moving entity via a predefined application programming interface on said computing device.

10. The system according to claim 6, wherein said performed proximity action comprises communicating, via a network, an instruction to activate an appliance at the destination.

11. A computer program product for augmenting operation of a navigation apparatus associated with a moving entity, the computer program product comprising:

a non-transitory, computer-readable storage medium; and computer-readable program code embodied in the storage medium, wherein the computer-readable program code configures a processor of a computing device to:

store in a memory storage unit associated with the computing device, one or more temporal proximity action plans, each action plan having a temporal proximity timer specifying: an estimated time value corresponding to an arrival time at a destination of the moving entity, an associated temporal proximity action, and a temporal proximity offset value;

determine that the time value of the temporal proximity timer is less than or equal to the temporal proximity offset value of one of said predefined temporal proximity action plans, wherein the temporal proximity timer is updated by the navigation apparatus based on an estimated time of arrival at a destination of a moving entity tracked by the navigation apparatus, and perform, responsive to determining that the value of the temporal proximity timer is less than or equal to the temporal proximity offset value, the predefined temporal proximity action associated with the predefined temporal proximity action plan; and said performed proximity action comprises communicating an alert notification to a recipient via an interface of said computing device.

12. The system according to claim 11 wherein the computer-readable program code is configured to operate separately from operation of the navigation apparatus.

13. The system according to claim 11 wherein the computer-readable program code further configures the processor to perform the predefined temporal proximity action when a value of the temporal proximity timer indicates a current time.

14. The computer program product according to claim 11, wherein said navigation apparatus updates said temporal proximity timer with an updated estimated time of arrival at a destination of the moving entity via a predefined application programming interface on said computing device.

15. The computer program product according to claim 11, wherein said performed proximity action comprises communicating, via a network, an instruction to activate an appliance at the destination.

* * * * *